US006850389B2

(12) United States Patent
Drake et al.

(10) Patent No.: US 6,850,389 B2
(45) Date of Patent: Feb. 1, 2005

(54) CROWNED DISC CLAMP

(75) Inventors: Brenda Kaye Drake, Longmont, CO (US); Roland Sesselmann, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 235 days.

(21) Appl. No.: 10/304,846

(22) Filed: Nov. 26, 2002

(65) Prior Publication Data

US 2004/0032691 A1 Feb. 19, 2004

Related U.S. Application Data

(60) Provisional application No. 60/404,112, filed on Aug. 15, 2002.

(51) Int. Cl.[7] ............................................. G11B 17/028
(52) U.S. Cl. ................................................... 360/99.12
(58) Field of Search ......................... 360/98.08, 99.05, 360/99.12; 720/706, 712

(56) References Cited

U.S. PATENT DOCUMENTS

| 5,101,306 A | | 3/1992 | Johnson | |
|---|---|---|---|---|
| 5,528,434 A | * | 6/1996 | Bronshvatch et al. | 360/98.08 |
| 5,550,690 A | | 8/1996 | Boutaghou et al. | |
| 5,590,004 A | | 12/1996 | Boutaghou | |
| 6,550,328 B1 | * | 4/2003 | Horning et al. | 73/468 |
| 6,594,109 B2 | * | 7/2003 | Renken | 360/98.08 |
| 2001/0043431 A1 | | 11/2001 | Yoshida et al. | |
| 2002/0024762 A1 | | 2/2002 | Renken | |
| 2002/0024763 A1 | | 2/2002 | Drake et al. | |
| 2002/0071206 A1 | | 6/2002 | Choo et al. | |

FOREIGN PATENT DOCUMENTS

JP          9-320160        * 12/1997

* cited by examiner

Primary Examiner—David Ometz
(74) Attorney, Agent, or Firm—Jennifer M. Buenzow

(57) ABSTRACT

A disc clamp assembly for securing a data storage disc to a drive motor in a disc drive includes a disc clamp having a central portion that can be secured to a drive motor, a raised portion extending around the central portion, and a contact portion extending around the raised portion for pressing down on the disc to secure the disc to the drive motor. The contact portion has an upwardly extending rim, and the rim has at least fifteen spaced apart upwardly extending projections positioned around the rim. A balance ring is seated in the contact portion.

22 Claims, 3 Drawing Sheets

CROWNED DISC CLAMP

RELATED APPLICATIONS

This application claims priority of U.S. provisional application Ser. No. 60/404,112, filed Aug. 15, 2002.

FIELD OF THE INVENTION

This application relates generally to disc drives and more particularly to a disc clamp in a disc drive.

BACKGROUND OF THE INVENTION

A disc drive typically includes one or more discs having digital information magnetically or optically stored thereon. The discs are rotated at a constant high speed by a drive motor, which may be a spindle motor, during operation of the drive. In a typical magnetic disc drive, information is written to and read from tracks on the discs through the use of an actuator assembly, which rotates during a seek operation. A typical actuator assembly includes a plurality of actuator arms, which extend towards the discs, with one or more flexures extending from each of the actuator arms. Mounted at the distal end of each of the flexures is a transducer mounted on a head, which acts as an air bearing slider enabling the head to fly in close proximity above the corresponding surface of the associated disc.

Increasing the density of information stored on discs can increase the storage capacity of disc drives. To read the densely stored information, designers have decreased the gap fly height between the heads and the discs. Reducing the gap fly height can lead to increased contact between the head and the data portion of the disc during operation of the disc drive (i.e., head-disc interference). Such interference can excite head and disc resonance frequencies, which can interfere-with the servo positioning of the recording transducers over the data tracks. For example, if head-disc interference occurs during a servo track writing operation, then spurious vibrations may be written into the servo pattern due to the excitation of head and disc resonance modes. Head-disc interference can also lead to accelerated head and disc surface wear. This may culminate in a "head crash," a phenomena where the recording head irreparably damages the disc surface, resulting in loss of data and catastrophic disc drive failure.

Head-disc interference is particularly likely if the disc surfaces are not sufficiently flat. Even if discs are flat before being mounted on the spindle motor, the disc clamp that secures the discs to the spindle motor may deform the discs by applying uneven pressure to the discs sufficient to increase head-disc interference.

Accordingly there is a need for a disc clamp that more evenly distributes clamping pressure applied to the discs. The present invention provides a solution to this and other problems, and offers other advantages over the prior art.

SUMMARY OF THE INVENTION

Against this backdrop the present invention has been developed. An embodiment of the present invention may be summarized as a disc clamp for securing a data storage disc to a drive motor. The disc clamp includes a generally disc-shaped body. The body has a central portion that can be secured to the drive motor, a raised portion extending around the central portion, and a contact portion extending around the raised portion. The contact portion has a bottom contact surface for pressing on a disc to secure the disc to a drive motor and an upwardly extending outer rim having means for decreasing a pressure differential around the contact portion between the disc and the bottom contact surface of the disc clamp pressing on the disc.

An embodiment of the present invention may be alternatively summarized as a disc drive having a disc pack assembly. The disc pack assembly preferably includes a data storage disc, a disc clamp securing the data storage disc to a spindle motor hub. The disc clamp has a generally disc-shaped body that includes a central portion secured to the hub, a raised portion extending around the central portion, and a contact portion extending around the raised portion and pressing down on the disc to secure the disc to the hub. The contact portion also has an upwardly extending rim defining an annular channel. The rim has at least fifteen spaced apart upwardly extending tabs positioned around the rim. A balance ring is seated in the annular channel.

An embodiment of the present invention may be alternatively summarized as a disc clamp assembly for securing a data storage disc to a drive motor in a disc drive. The assembly includes a disc clamp for securing a data storage disc to a drive motor. The disc clamp includes a central portion that can be secured to a drive motor, a raised portion extending around the central portion, and a contact portion extending around the raised portion for pressing down on the disc to secure the disc to the drive motor. The contact portion has an upwardly extending rim, and the rim has at least fifteen spaced apart upwardly extending projections positioned around the rim. A balance ring is seated in the contact portion These and various other features as well as advantages which characterize the present invention will be apparent from a reading of the following detailed description and a review of the associated drawings.

DETAILED DESCRIPTION

Figure 1:
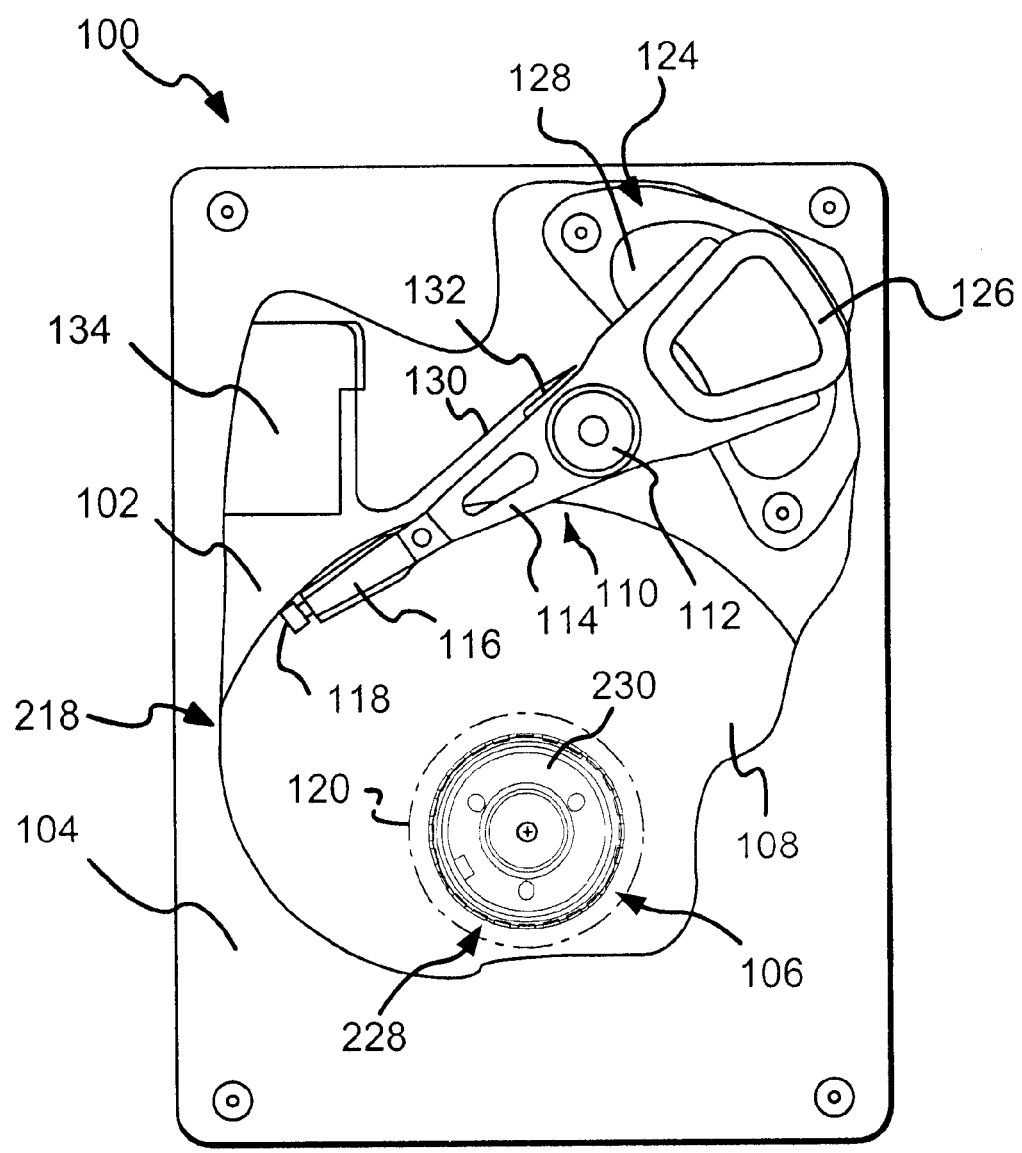
FIG. 1 is a plan view of a disc drive incorporating a preferred embodiment of the present invention showing the primary internal components.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a drive motor that is preferably a spindle motor 106, which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118, which includes an air bearing slider enabling the head 118 to fly in close proximity above the corresponding Surface of the associated disc 108.

During a seek operation, the track position of the heads 118 is controlled through the use of a voice coil motor 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are typically moved over park zones 120 near the inner diameter of the discs 108 or on ramps near the inner or outer diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the transducers on the heads 118. The printed circuit board 132 typically includes circuitry for controlling the write currents applied to the transducers on the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 3:
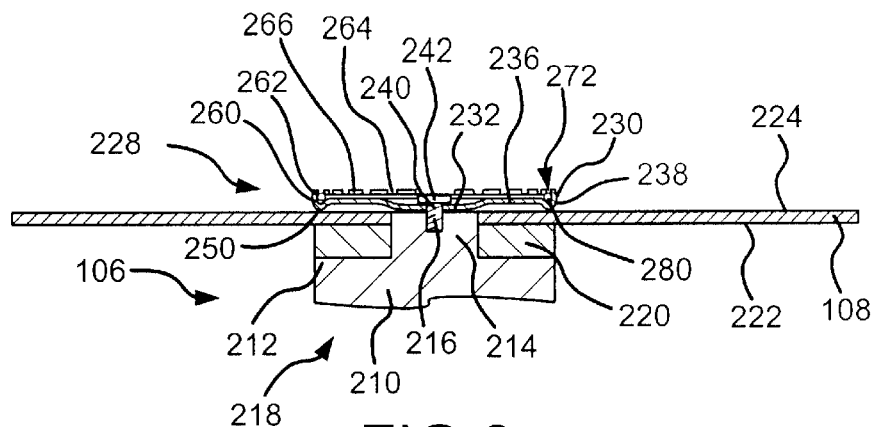
FIG. 3 is a sectional view taken along line 3—3 of FIG. 2.
Figure 2:
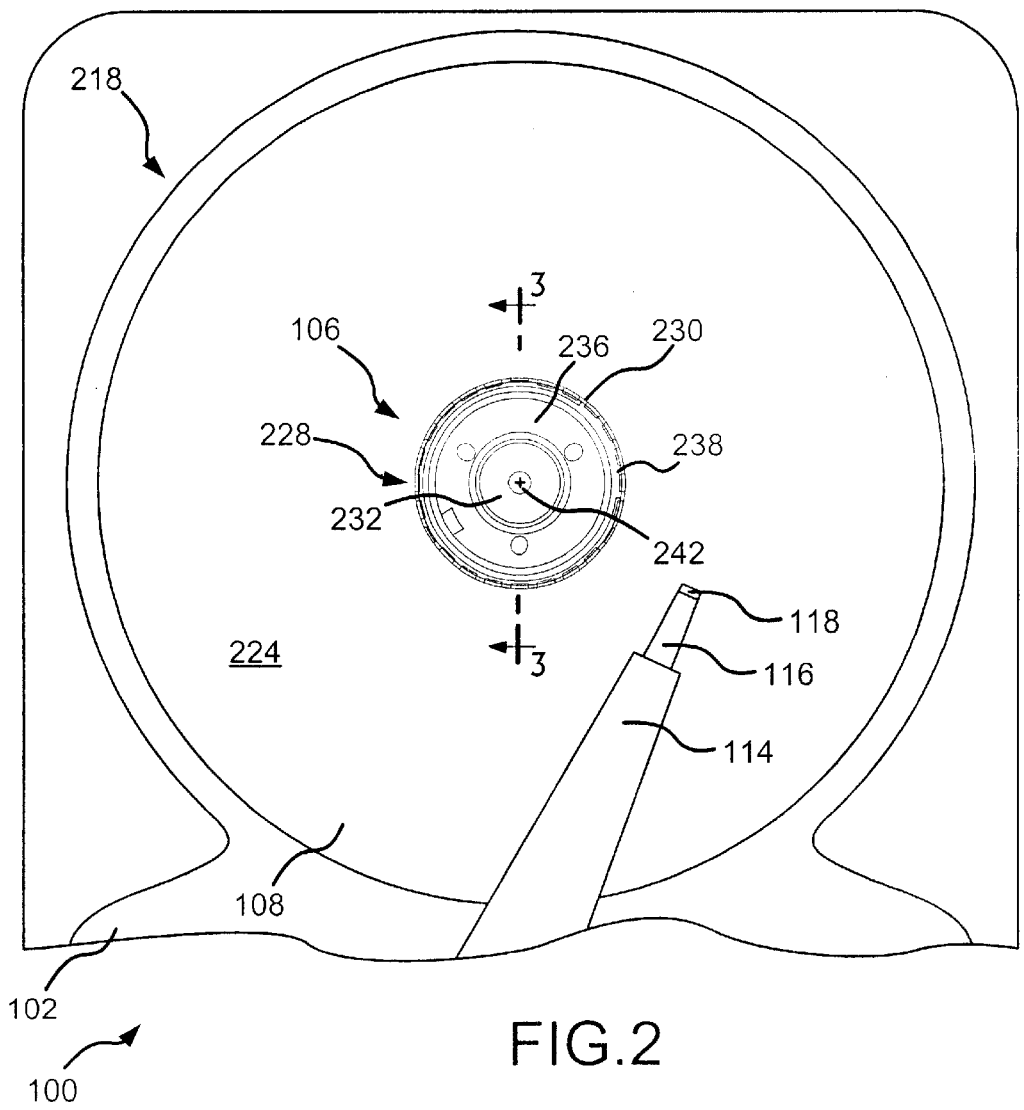
FIG. 2 is a cut-away plan view of a disc drive without a cover according to a preferred embodiment of the present invention.

Referring to FIGS. 2–3, the spindle motor 106 has stationary stator coils (not shown) and carries a generally cylindrical hub 210, rotatably mounted on a stationary spindle (not shown). The hub 210 shown in FIG. 3 has a cylindrical bottom flange 212 and a cylindrical body 214 extending up from the flange 212. The body 214 defines a centrally located fastener hole 216. The flange 212, body 214, and fastener hole 216 are all preferably substantially concentric. Notably, the hub can have many different configurations in accordance with the present invention. For example, the hub can include several circumferentially spaced fastener holes, rather than a single centrally located faster hole 216. A disc pack assembly 218 includes the hub 210 and the discs 108.

The disc pack assembly 218 also includes an annular spacer 220 that is seated on the hub 210 so that it extends around the body 214 and rests on the flange 212. The present invention can be used without the spacer 220. Also, in an embodiment wherein the disc drive 100 includes multiple discs 108, spacers 220 preferably separate each of the discs 108. The disc 108 is in turn seated on the hub 210 so that it extends about the body 214 and rests on the spacer 220. The disc 108 has a lower surface 222 and an upper surface 224 with a portion of each having data stored thereon.

Figure 4:
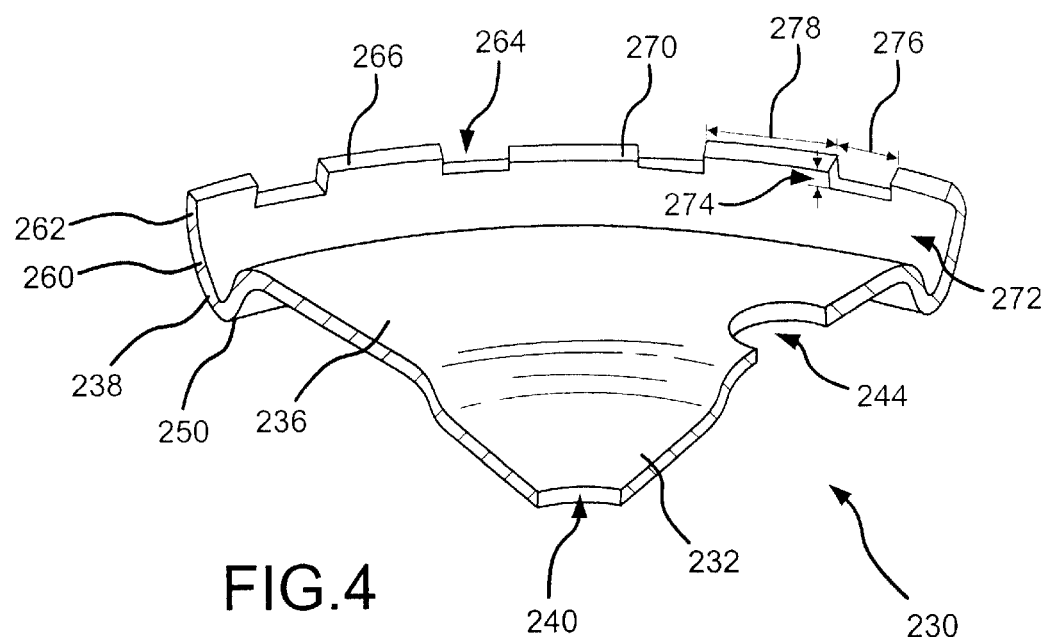
FIG. 4 is a separate cut-away perspective view of a section of the disc clamp of FIG. 2 according to a preferred embodiment of the present invention.
Figure 5:
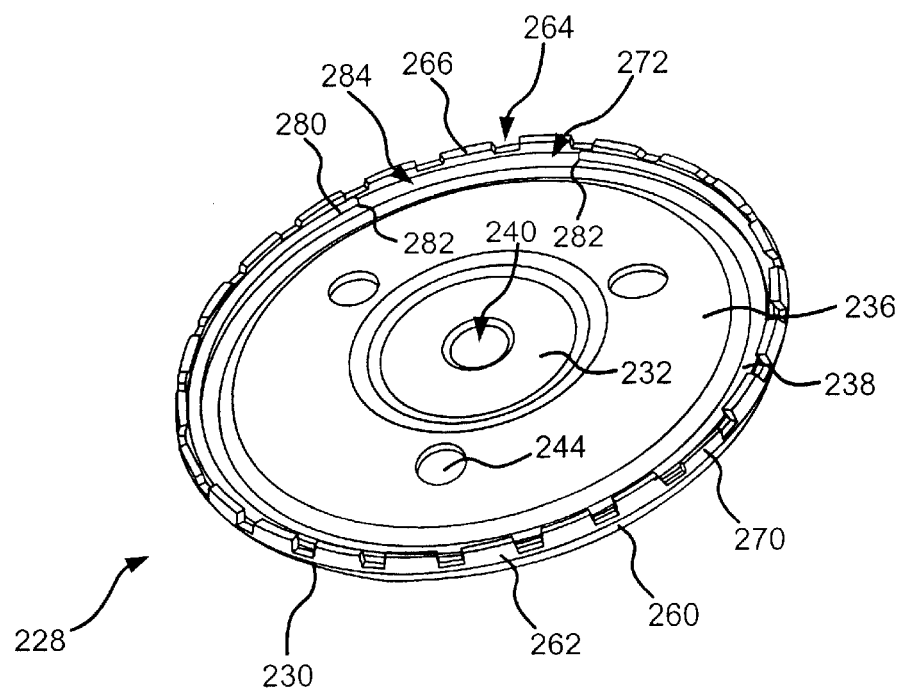
FIG. 5 is a separate perspective view of the disc clamp assembly of FIG. 2.

Referring to FIGS. 2–5, the disc pack assembly 218 includes a disc clamp assembly 228 (seen separately in FIG. 5). The disc clamp assembly 228 includes a disc clamp 230, which is centrally located on the upper surface 224 of the disc 108. The disc clamp 230 is preferably a generally disc-shaped body with a central portion 232; an annular raised portion 236 extending around the central portion 232 and beyond the inner diameter of the upper data surface 224 of the disc 108; and an outer annular contact portion 238 extending around the raised portion 236.

The central portion 232 preferably defines a centrally located fastener hole 240. Alternatively, the central portion 232 could define multiple circumferentially spaced fastener holes, depending on the design of the corresponding spindle motor hub 210. The fastener hole 240 receives a fastener 242 that extends into the fastener hole 216 of the hub 210 to secure the disc clamp 230 to the hub 210. The raised portion 236 may define three circumferentially spaced spanner slots 244 that are each elongated in a radial direction, but more preferably the raised portion 236 defines no spanner slots 244. Spanner slots allow the application of a tool during mounting of the clamp that prevents the clamp from rotating during screw install. The raised portion 236 may be a solid ring or it may be some other shape, such a shape including multiple spokes extending outward from the central portion 232.

The outer contact portion 238 has a downwardly facing contact surface 250 that contacts the upper data surface 224 of the disc 108 as shown in FIG. 3. A rim 260 extends up and in from the contact surface 250 to a crown or upper portion 262 of the rim 260 The crown 262 of the rim 260 has alternating downwardly recessed portions or cutouts 264 and upwardly extending projections or tabs 266. Notably, some of the tabs 266 may be tooling marks 270 that differ from the remaining tabs 266. The tooling marks 270 preferably do not differ from the remaining tabs 266. Such tooling marks 270 may be the remains of arms that are used for positioning while forming the disc clamp 230, as discussed below. The contact portion 238 preferably forms an annular holding channel 272. More specifically, the contact portion 238, including the rim 260 preferably curves to form an inwardly facing concave surface that defines the channel 272.

Referring to FIG. 4, in a preferred embodiment of the present invention, the height differential 274 between the top and the base of each tab 266 is the same for all tabs 266, except the tooling marks 270, which may be shorter than the remaining tabs 266. In another embodiment, the tooling marks 270 may be the same height as the remainder of the tabs 266. Preferably, the spacing or cutout width 276 between each tab 266 is the same, and the tab width 278 of each tab 266 is the same. However, the spacing 276, the width 278, and/or the height 274 of different tabs 266 could vary to counteract the effects of other features, such as the spanner slots 244, on the distribution of pressure between the disc clamp 230 and the upper data surface 224 of the disc 108. The specific dimensions and spacing of the tabs 266 is preferably optimized within manufacturing constraints using standard modeling software.

Referring to FIGS. 3 and 5, the disc clamp assembly 228 further includes a balance ring 280 seated within the holding channel 272. The balance ring 280 is preferably a spring wire with opposing ends 282 and an intervening gap 284 between the ends 282. The balance ring 280 preferably presses outwardly against the rim 260 and is thus held in place within the channel 272 by the rim 260. The balance ring 280 is used to balance the weight of the disc pack assembly 218, or in other words to shift the center of mass for the disc pack assembly 218 closer to its center of rotation. To do this balancing, a balance ring 280 with an optimal size gap 284 is chosen based on the magnitude of the displacement of the center of mass of the disc pack assembly 218 from its center of rotation. The selected balance ring 280 is then placed within the channel 272 with the gap 284 positioned so that the balance ring 280 will shift the center of mass of the disc pack assembly 218 closer to its center of rotation.

The disc clamp 230 is preferably made of stainless steel, although it could be made of some other type of material. Preferably, the disc clamp 230 is formed by stamping. The stamping process uses a circular sheet of material (not shown). That sheet preferably includes three arms that extend radially outward from a circular sheet to aid in holding the sheet during the stamping process. During the stamping process, the alms are cut and bent upward to form the tooling marks 270. Also, the stamping process typically requires breaks in the rim 260 to allow pressure in the rim 260 to be relieved when the rim 260 is formed by being bent upward against a stamping dye during the stamping process. The breaks are also typically needed to allow the rim 260 to be bent in sections, thus allowing the stamping dye to be removed from the channel 272 after the rim 260 is bent upward around the dye.

Referring to FIG. 3, the fastener 242 preferably engages the central portion 232 and draws the central portion 232 down beyond its normal resting position, thereby creating stresses in the raised portion 236 so that the raised portion 236 applies a constant downward pressure on the contact portion 238. The contact surface 250 of the contact portion 238 in turn applies a downward pressure on the upper surface 224 of the disc 108 to hold the disc 108 securely in place on the hub 210 of the drive motor 106.

Referring back to FIG. 5, it is desirable that the pressure differential of the disc clamp 230 (i.e., the difference between the highest pressure and the lowest pressure credited by the disc clamp 230 pressing against the upper surface 224 of the disc 108) be minimized to minimize resulting deformation of the disc 108. Several features of the disc clamp 230 may increase the pressure differential of the disc clamp 230. Such features include the spanner slots 244 and even the tooling marks 270, the cutouts 264 adjacent the tooling marks 270, and/or other pressure relief cutouts 264 in the rim 260.

Modeling software, such as the modeling software sold under the name ANSYS, available from Ansys, Inc. in Canonsburg, Pa., can be used to optimize the number, size and shape of cutouts for a particular disc pack design and its unique requirements. One such case predicts that adding more cutouts 264 and tabs 266 in addition to the tooling marks 270 and adjacent cutouts 264 tends to increase the pressure differential of the disc clamp 230, rather than decreasing it, until about twelve to fifteen cutouts and about twelve to fifteen tabs are present. Surprisingly, in accordance with the present invention it has been found that further increasing the number of tabs and cutouts to fifteen of each actually decreases the pressure differential of the disc clamp 230 so that the pressure differential with fifteen tabs is less than with only twelve tabs Adding even more tabs 266 and cutouts 264 further decreases the pressure differential until twenty-four tabs 266 and twenty-four cutouts 264 are present, as is shown in FIGS. 1–5. It is believed that adding even more than twenty-four tabs 266 and twenty-four cutouts 264 may further decrease the pressure differential of the disc clamp 230. It is believed that the number of tabs 266 sufficient to decrease the pressure differential will vary for each disc pack design and its unique requirements. However, the sufficient number of tabs 266 can be determined using standard modeling software.

An embodiment of the present invention may be described as a disc clamp (such as 230) for securing a data storage disc (such as 108) to a drive motor (such as 106). The disc clamp includes a generally disc-shaped body The body has a central portion (such as 232) that can be secured to the drive motor, a raised portion (such as 236) extending around the central portion, and a contact portion (such as 238) extending around the raised portion. The contact portion has a bottom contact surface (such as 250) for pressing on a disc (such as 108) to secure the disc to a drive motor and an upwardly extending outer rim (such as 260) having means for decreasing a pressure differential around the contact portion between the disc and the bottom contact surface of the disc clamp pressing on the disc.

In a preferred embodiment, the means for decreasing includes projections (such as 266) spaced apart around the rim. The projections preferably include at least fifteen projections and more preferably include at least twenty-four projections. The rim preferably extends up and radially in to define a channel (such as 272) that is adapted to receive a balance ring. The body preferably comprises stainless steel. The raised portion preferably defines spanner slots (such as 244) that are able to receive locating members. The spanner slots preferably include three radially extending slots.

An embodiment of the present invention may be alternatively described as a disc drive (such as 100) having a disc pack assembly (such as 218). The disc pack assembly preferably includes a data storage disc (such as 108), a disc clamp (such as 230) securing the data storage disc to a spindle motor hub (such as 210). The disc clamp has a generally disc-shaped body that includes a central portion (such as 232) secured to the hub, a raised portion (such as 236) extending around the central portion, and a contact portion (such as 238) extending around the raised portion and pressing down on the disc to secure the disc to the hub. The contact portion also has an upwardly extending rim (such as 260) defining an annular channel (such as 272). The rim has at least fifteen spaced apart upwardly extending tabs (such as 266) positioned around the rim. A balance ring (such as 280) is seated in the annular channel.

An embodiment of the present invention may be alternatively described as a disc clamp assembly (such as 228) for securing a data storage disc (such as 108) to a drive motor (such as 106) in a disc drive (such as 100). The assembly includes a disc clamp (such as 230) for securing a data storage disc (such as 108) to a drive motor (such as 106). The disc clamp includes a central portion (such as 232) that can be secured to a drive motor (such as 106), a raised portion (such as 236) extending around the central portion, and a contact portion (such as 238) extending around the raised portion for pressing down on the disc to secure the disc to the drive motor. The contact portion has an upwardly extending rim (such as 260), and the rim has at least fifteen spaced apart upwardly extending projections (such as 266) positioned around the rim. A balance ring (such as 280) is seated in the contact portion.

It will be clear that the present invention is well adapted to attain the ends and advantages mentioned as well as those inherent therein. While presently preferred embodiments have been described for purposes of this disclosure, various changes and modifications may be made which are well within the scope of the present invention. For example, the cutouts and tabs could be various different shapes. Numerous other changes may be made which will readily suggest themselves to those skilled in the art and which are encompassed in the scope of the invention disclosed and as defined in the appended claims.

What is claimed is:

1. A disc clamp for securing a data storage disc to a drive motor, the disc clamp comprising.
   a generally disc-shaped body comprising:
   a central portion adapted to be secured to the drive motor;
   a raised portion extending around the central portion;
   a contact portion extending around the raised portion having a bottom contact surface for pressing on a disc to secure the disc to a drive motor; and
   an upwardly extending outer rim of the contact portion having means for decreasing a pressure differential around the contact portion between the disc and the bottom contact surface of the disc clamp pressing on the disc.

2. The disc clamp of claim 1, wherein the means for decreasing comprises projections spaced apart around the rim.

3. The disc clamp of claim 2, wherein the projections comprise at least fifteen projections.

4. The disc clamp of claim 3, wherein the at least fifteen projections comprises at least twenty-four projections.

5. The disc clamp of claim 1, wherein the rim extends up and radially in to define a channel that is adapted to receive a balance ring.

6. The disc clamp of claim 1, wherein the body comprises stainless steel.

7. The disc clamp of claim 1, wherein the raised portion defines spanner slots that are adapted to receive locating members.

8. The disc clamp of claim 7, wherein the spanner slots include three radially extending spanner slots.

9. A disc drive having a disc pack assembly, the disc pack assembly comprising:
   a data storage disc;
   a disc clamp securing the data storage disc to a spindle motor hub, the disc clamp having a generally disc-shaped body comprising:
   a central portion secured to the hub;
   a raised portion extending around the central portion; and
   a contact portion extending around the raised portion and pressing down on the disc to secure the disc to the hub, the contact portion also having an upwardly extending rim defining an annular channel, wherein the rim has at least fifteen spaced apart upwardly extending tabs positioned around the rim; and
   a balance ring seated in the annular channel.

10. The disc drive of claim 9, wherein the tabs are substantially rectangular.

11. The disc drive of claim 9, wherein the at least fifteen tabs comprises at least twenty-four tabs.

12. The disc drive of claim 9, wherein the rim extends up and radially in to define the channel.

13. The disc drive of claim 9, wherein the body comprises stainless steel.

14. The disc drive of claim 9, wherein the balance ring is a spring wire having first and second ends and defining a gap between the first and second ends.

15. The disc drive of claim 9, wherein the raised portion defines spanner slots that are adapted to receive locating members.

16. A disc clamp assembly for securing a data storage disc to a drive motor in a disc drive, the assembly comprising:
    a disc clamp for securing a data storage disc to a drive motor, the disc clamp comprising:
    a central portion adapted to be secured to a drive motor;
    a raised portion extending around the central portion; and
    a contact portion extending around the raised portion for pressing down on the disc to secure the disc to the drive motor, the contact portion also having an upwardly extending rim, wherein the rim has at least fifteen spaced apart upwardly extending projections positioned around the rim; and
    a balance ring seated in the contact portion.

17. The assembly of claim 16, wherein the projections are substantially rectangular.

18. The assembly of claim 16, wherein the at least fifteen projections comprises at least twenty-four projections.

19. The assembly of claim 16, wherein the rim extends up and radially in to define the channel.

20. The assembly of claim 16, wherein the body comprises stainless steel.

21. The assembly of claim 16, wherein the balance ring is a spring wire having first and second ends and defining a gap between the first and second ends.

22. The assembly of claim 16, wherein the raised portion defines spanner slots that are adapted to receive locating members.

* * * * *